(12) United States Patent
Chipman

(10) Patent No.: US 11,065,700 B1
(45) Date of Patent: Jul. 20, 2021

(54) POST NOTCH FORMING TOOL AND RELATED METHODS

(71) Applicant: John L. Chipman, La Ward, TX (US)

(72) Inventor: John L. Chipman, La Ward, TX (US)

( * ) Notice: Subject to any disclaimer, the term of this patent is extended or adjusted under 35 U.S.C. 154(b) by 0 days.

(21) Appl. No.: 17/017,367

(22) Filed: Sep. 10, 2020

Related U.S. Application Data

(60) Provisional application No. 63/018,592, filed on May 1, 2020.

(51) Int. Cl.
*B23D 59/00* (2006.01)
*B27B 17/00* (2006.01)
*B23D 57/02* (2006.01)

(52) U.S. Cl.
CPC ......... *B23D 59/002* (2013.01); *B23D 57/023* (2013.01); *B27B 17/0083* (2013.01); *B27B 17/0008* (2013.01)

(58) Field of Classification Search
CPC ............... B23D 59/002; B23D 57/023; B27B 17/0083; B27B 17/0008; B23Q 9/0028; Y10T 83/68; Y10T 83/7101; Y10T 83/8763
See application file for complete search history.

(56) References Cited

U.S. PATENT DOCUMENTS

| | | | |
|---|---|---|---|
| 1,589,030 A | | 6/1926 | Whiting |
| 3,026,918 A | * | 3/1962 | Dooley ............... B27B 17/0083 30/371 |
| 3,092,156 A | * | 6/1963 | Hayden ............... B27B 17/0083 30/371 |
| 3,134,409 A | * | 5/1964 | Hayden ............... B27B 17/0083 30/371 |
| 3,199,560 A | | 8/1965 | O'Donovan |
| 3,225,799 A | * | 12/1965 | Hayden ............... B27B 17/0083 30/371 |
| 3,931,676 A | * | 1/1976 | Merle .................. A01G 23/091 30/371 |

(Continued)

OTHER PUBLICATIONS

Stephens, Lucas Richard, 1/35: Building a Post and Beam Garage—chainsaw accuracy, Nov. 24, 2017, www.youtube.com, available on Nov. 2, 2020 at : https://www.youtube.com/watch?v=qJ1aoQ-5dl) (Year: 2017).*

(Continued)

*Primary Examiner* — Jonathan G Riley
(74) *Attorney, Agent, or Firm* — Suzanne Kikel, Patent Agent

(57) ABSTRACT

Post notch forming tool mounted on a handheld saw blade for forming a notch in a post end. The tool has a base, a handle, and two L-shaped members with bolt assemblies for attaching the tool to the saw blade. The base has a first extended lip which slides downwardly along the post's outer surface to guide the tool to form a 3-inch notch. A spacer member is selectively attached to the L-shaped members and has a second extended lip which slides downwardly along the post's outer surface to guide the tool to form a 1½ inch notch. Method steps include using the power saw blade to form a transverse cut intersecting the longitudinal axis, using the extended lip of the base to form a 3-inch notch, or attaching the spacer member and using its extended lip to form a 1½ inch notch in the post's outer surface.

6 Claims, 4 Drawing Sheets

(56) References Cited

U.S. PATENT DOCUMENTS

| | | | | |
|---|---|---|---|---|
| 3,965,788 | A * | 6/1976 | Granberg | B23Q 9/0014 83/745 |
| 4,048,720 | A * | 9/1977 | Wheeler | B23Q 9/0014 30/372 |
| 4,070,757 | A * | 1/1978 | Granberg | B27B 17/0083 30/371 |
| 4,122,604 | A * | 10/1978 | Brown | B23Q 9/0028 30/371 |
| 4,134,203 | A * | 1/1979 | Grube | B23Q 9/0028 30/371 |
| 4,146,962 | A * | 4/1979 | Grube | B23Q 9/0014 30/371 |
| 4,173,240 | A * | 11/1979 | Boyce | B27B 17/0083 144/136.1 |
| 4,244,104 | A * | 1/1981 | Grube | B23Q 9/0028 30/371 |
| 4,270,272 | A * | 6/1981 | Graham | B27G 19/003 30/371 |
| 4,388,762 | A * | 6/1983 | Debell, Jr. | B27B 17/0025 30/383 |
| 4,611,521 | A * | 9/1986 | McCardle | B27B 17/0058 30/382 |
| 4,726,274 | A * | 2/1988 | Pitoni | B23Q 9/0014 83/574 |
| 4,833,781 | A * | 5/1989 | Allen | B27B 17/0083 30/377 |
| 4,854,206 | A * | 8/1989 | Wilfong | B27B 17/0083 83/745 |
| 4,888,872 | A * | 12/1989 | Eistrat | B27B 17/0083 30/371 |
| 5,427,007 | A * | 6/1995 | Bystrom | B27B 17/0083 30/371 |
| 5,511,315 | A * | 4/1996 | Raya | B27B 17/0083 30/371 |
| 5,878,800 | A * | 3/1999 | Young | B27F 5/12 144/372 |
| 6,038,775 | A * | 3/2000 | Holladay | B23Q 9/0028 30/376 |
| 6,763,754 | B1 | 7/2004 | Glenn | |
| 8,156,654 | B2 * | 4/2012 | Reed | B27B 17/00 30/371 |
| 9,920,531 | B1 * | 3/2018 | Charest | E04C 3/12 |
| 2008/0164400 | A1 * | 7/2008 | Beechinor | B27B 17/0008 248/500 |
| 2009/0100977 | A1 * | 4/2009 | Perkins | B27B 17/00 83/820 |
| 2009/0133269 | A1 * | 5/2009 | Hanaway | B27B 17/0083 30/383 |
| 2011/0203122 | A1 * | 8/2011 | Holcomb | B27B 17/14 30/382 |
| 2013/0055870 | A1 | 3/2013 | Sheddy et al. | |
| 2014/0047723 | A1 * | 2/2014 | Vidale Wade | B27B 17/0083 30/383 |
| 2018/0141233 | A1 * | 5/2018 | Charest | B27B 17/02 |

OTHER PUBLICATIONS

Jak2, Pergola Design (2), Jul. 4, 2014, Fine Homebuilding, available on Nov. 2, 2020 at https://www.finehomebuilding.com/forum/pergola-design-2 (Year: 2014).*

* cited by examiner

POST NOTCH FORMING TOOL AND RELATED METHODS

CROSS REFERENCE TO RELATED APPLICATIONS

This application claims priority to U.S. Provisional Patent Application Ser. No. 63/018,592 filed May 1, 2020, entitled "Notching Tool", the disclosure of which is incorporated herein by reference in its entirety.

BACKGROUND OF THE INVENTION

1. Field of the Invention

The present invention relates, in general, to hand held tools. More particularly, the invention relates to a post notch forming tool attached to a hand held saw for measuring and guiding the hand-held saw down into the post to form one or more notches therein, and to methods related thereto. The post notch forming tool is constructed to selectively form a notch two different depths.

2. Brief Description of the Prior Art

Pilings are set by first building scaffolding. A plumb line is set on the piling to the desired elevation. Then, using a saw, a cut is made at the desired line.

Using a notched post and beam connection will lock a beam in place, secure it from rotating, and resist wind uplift. In general, notching a post does not weaken the structural integrity of the wood since the load is transferred down through the post and into the footings. The upright notched section of the post stabilizes the beam. Most deck builders use a reciprocating saw to cut an L-shaped notch or seat in the top of the post which is large enough to hold the beam. Another building method is to use a saw to score the top of the post and then to remove the weakened sections of the post with a chisel or similar device.

This present-day method tends to be time-consuming.

There is a need, therefore, in the art to provide a post notch forming tool which is attached to a reciprocating saw for rapidly and efficiently forming one or more notches in the top of a post.

Additionally, present notching tools are such that only a notch of one size can be formed in the post.

There is, therefore, a further need in the art to provide a post notch forming tool which can be attached to a reciprocating saw and which is structured so that a different size notch can selectively be formed in the post.

SUMMARY OF THE INVENTION

The present invention meets such needs. The present invention provides a post notch forming tool for forming a notch in an end of a post. The notch may be one of two predetermined sizes; that is, it may have a depth of 1 inches or a depth of 3 inches when considered inwardly from the outer surface of the post. After a blade of a hand-held power saw is used to form a transverse cut into the post at a predetermined distance down from the end of the post, the post notch forming tool of the invention is attached to the blade of the hand-held saw and a longitudinal cut is made inwardly along the post until this longitudinal cut intersects the transverse cut, at which time the formed block is removed to form a notch in the side of the post. As the post notch forming tool travels down along the outer surface of the post, the tool guides the blade of the saw such that the notch is efficiently formed therein.

The post notch forming tool comprises a base having first and second surfaces, first and second ends; a handle mounted on the first surface of the base; a first L-shaped member having a first leg connected to the first end of the base and a second leg spaced away from the second surface of the base by a first notch-size forming preset distance; a second L-shaped member having a first leg connected to the second end of the base and a second leg spaced away from the second surface of the base by the first notch-size forming preset distance; a first blade-attaching bolt assembly secured to the second leg of the first L-shaped member; and a second blade-attaching bolt assembly secured to the second leg of the second L-shaped member. The first notch-size forming preset distance is defined by a first extended lip of the base to the end of the second leg of the two L-shaped members. This first notch-size forming preset distance may be about 3 inches.

The post notch forming tool of the invention further comprises a spacer member attached to the first legs of the first and second L-shaped members via bolts. The spacer member has a first surface and a second surface with a second extended lip spaced away from the first extended lip of the base of the tool. A second notch-size forming preset distance is defined by the second extended lip of the spacer member to the end of the second leg of the two L-shaped members. This second notch-size forming preset distance may be about half the size of the first notch-size forming preset distance, that is, about, 1½ inches.

The spacer member further comprises an intermediate leg member integrally connected to the spacer member and which is connected at its one end to the second surface of the base, and wherein the intermediate leg member aids in fixedly spacing the spacer member away from the first extended lip of the base of the post notch forming tool.

The post notch forming tool of the invention is mounted to a blade of a hand-held saw for its operation. A method for forming a notch involves cutting into the post in a transverse direction along the body of the post; attaching the tool to the blade of the hand-held saw; allowing the first extended lip of the base to slide down along the outer surface of the post to guide the tool down alongside the outer surface of the post until it intersects the transverse cut; and removing the formed block to form a notch in the side of the post from the top of the post. The inward depth of the notch in the first side of the post equals the first notch-size forming preset distance.

A further method involves cutting into the post in a transverse direction along the body of the post; attaching the spacer member to the base of the tool via bolts; attaching the tool to the blade of the hand-held saw; allowing the second extended lip of the spacer member to slide down along the outer surface of the post to guide the tool down alongside the outer surface of the post until the blade intersects the transverse cut; and removing the formed block to form a notch in the first side of the post. The inward depth of this notch will equal the second notch-size forming preset distance.

Further steps involve forming a notch in a second side of the post opposite to the first side according to the steps discussed herein above for forming a notch in the first side of the post.

These and other features and advantages of the present invention will be better appreciated and understood when the following description is read in light of the accompany drawings.

BRIEF DESCRIPTION OF THE DRAWING

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

The invention is embodied in a post notch forming tool 10 and methods for using tool 10 to form cut-out portions or L-shaped notches in one or more sides of an end of a post P. Tool 10 is structured such that a notch of a varied depth, such as, a 1½ inch or a 3-inch, can selectively be formed in the post. Posts having these L-shaped notches are generally used as pilings or in a notched post and beam connection for building a deck.

The structure of post notch forming tool 10 is described with reference to FIGS. 1, 2 and 2A, and the methods of using post notch forming tool 10 to form notches in one or more sides of the post are described with reference to FIGS. 3A through 3E and FIG. 4.

Figure 1:
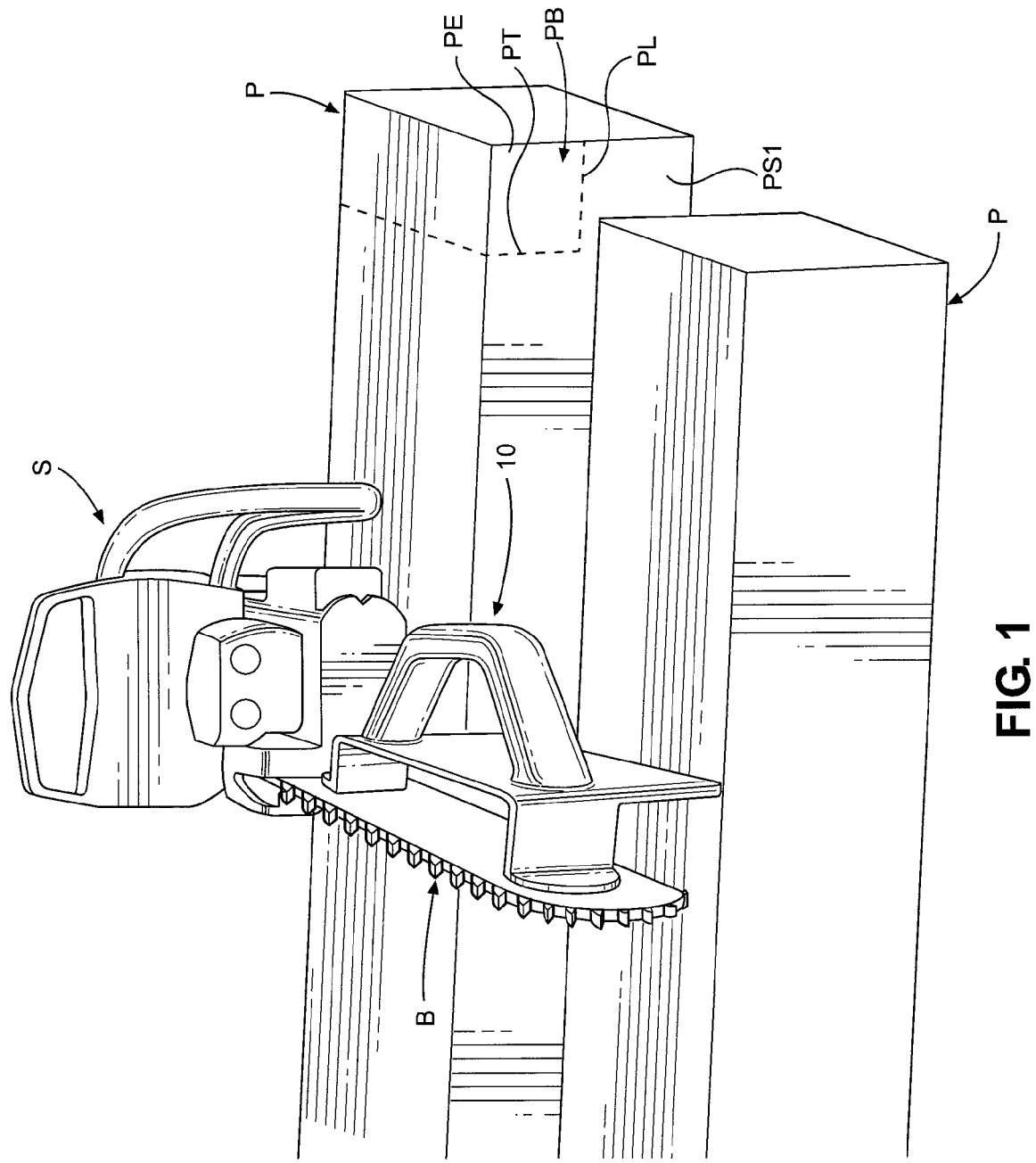
FIG. 1 is a perspective view of a post notch forming tool of the invention mounted on a hand-held saw.
Figure 2:
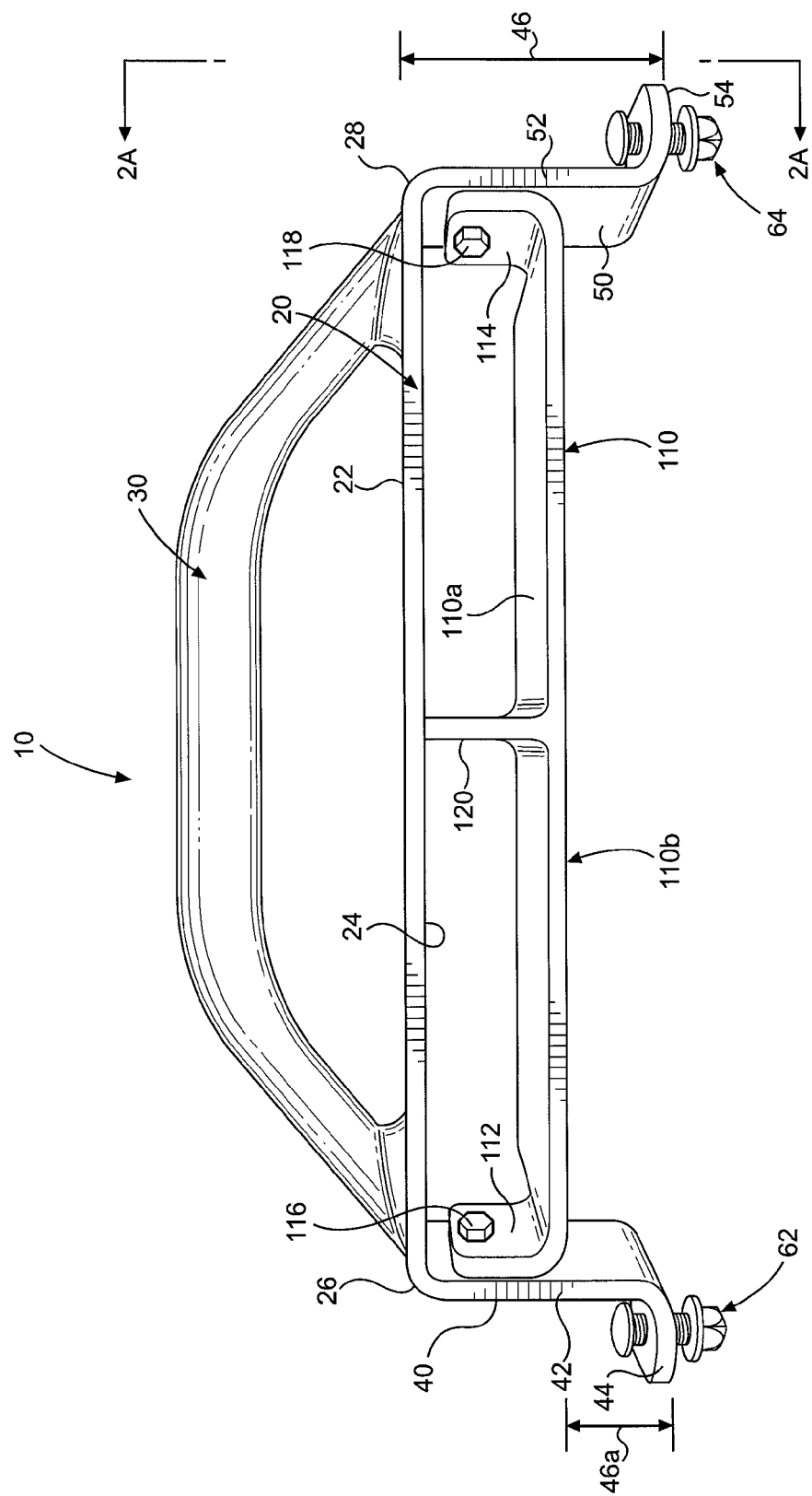
FIG. 2 is a top view of the post notch forming tool of the invention wherein a spacer member is inserted and secured therein.
Figure 2A:
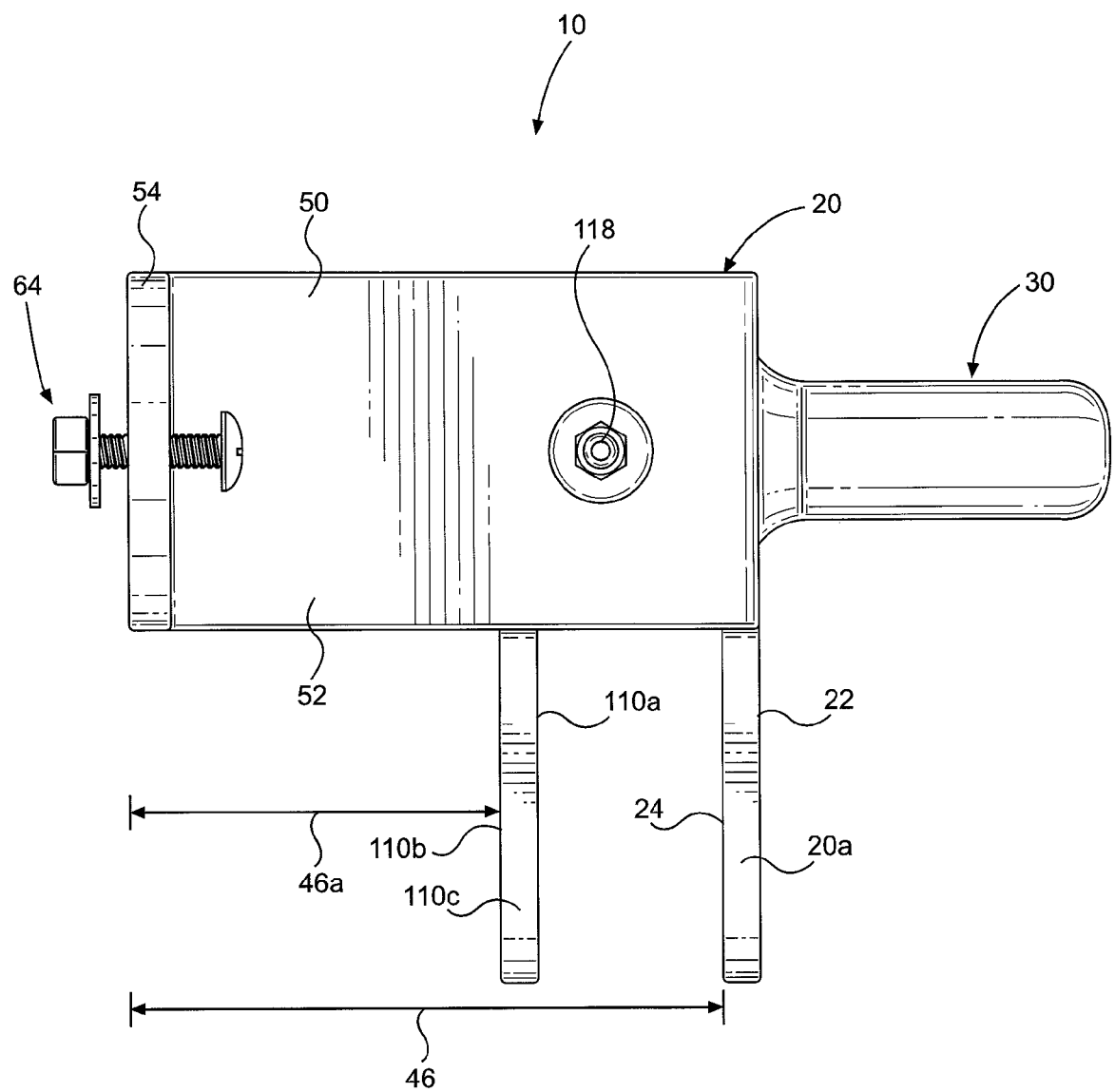
FIG. 2A is a side view taken along lines 2A-2A of FIG. 2.

Referring to FIGS. 1, 2 and 2A, post notch forming tool 10 acts as a guide to cut notches in an end of a post P in an efficient and easy manner. FIG. 1 schematically illustrates post notch forming tool 10 attached to a blade B of a hand-held saw S. FIG. 2 illustrates the components of the post notch forming tool 10 prior to being attached to blade B of hand-held saw S. Hand-held saw S of FIG. 1 is, preferably, a power saw having a blade connected to a motor M for reciprocation of the blade for a cutting action when motor M is activated. The structure and operation of a hand-held saw S of FIG. 1 is well-known to those skilled in the art.

FIG. 1 schematically illustrates two spaced apart posts P1 and P2 supported on a work table (not shown) with the hand-held saw S extending thereacross and resting on the posts and with post notch forming tool 10 attached to blade B of saw S. As shown in FIG. 1, post P is indicated as having a body PB; an end PE; and a first side PS1. A longitudinal axis PL extends from the end PE and inwardly thereof, and a transverse axis PT extends from first side PS1 at a right angle relative to longitudinal axis PL, more about which is discussed herein below.

With reference to FIG. 2, post notch forming tool 10 comprises a base 20 having a first surface 22, a second surface 24, a first end 26, and a second end 28. A handle 30 is mounted on first surface 22 of base 20. As shown to the left in FIG. 2, a first L-shaped member 40 is connected to first end 26 of base 20, and has a first leg 42 extending from first surface 22 of base 20 and a second leg 44 extending away from first leg 42. As shown to the right in FIG. 2, a second L-shaped member 50 is connected to the second end 28 of base 20, and has a first leg 52 extending from first surface 22 of base 20 and a second leg 54 extending away from the first leg 52. As is apparent in FIG. 2, first leg 42 of L-shaped member 40 has a length greater than that of second leg 44. Likewise, first leg 52 of L-shaped member 50 has a length greater than that of second leg 54. It is to be understood that the total length of first leg 42 and second leg 44 of first L-shaped member 40 and the total length of first leg 52 and second leg 54 of second L-shaped member 50 are substantially equivalent to a predetermined length representing a preset distance for forming a notch in the end of a post. This predetermined length is referred to hereinafter as a "first notch-size forming preset distance" and is represented by a double arrow indicated at reference number 46 shown to the right in FIG. 2. In an embodiment of the invention, this first notch-size forming preset distance 46 is 3 inches.

As best shown in FIG. 2A, base 20 of post notch forming tool 10 also comprises a first extended lip 20a formed by first surface 22 and second surface 24 of base 20. It is to be appreciated that the first notch-size forming preset distance 46 is also defined by the first extended lip 20a since it is defined by the first surface 22 and second surface 24 of base 20.

Referring again to FIG. 2, post notch forming tool 10 further comprises a first blade-attaching bolt assembly 62 located on second leg 44 of first L-shaped member 40, and a second blade-attaching bolt assembly 64 located on second leg 54 of second L-shaped member 50. A spacer member 110 is mounted between and abuts L-shaped members 40, 50. Spacer member 110 has an intermediate leg 120 and two opposed end legs 112, 114. Spacer member 110 also includes a first surface 110a and a second surface 110b.

As shown, end leg 112 abuts an inner surface of L-shaped member 40, and end leg 114 abuts an inner surface of L-shaped member 50. End leg 112 is secured to first leg 42 of L-shaped member 40 via a bolt 116, and end leg 114 is secured to first leg 52 of L-shaped member 50 via bolt 118. As can be understood from FIG. 2, spacer member 110 is spaced away from second surface 24 of base 20 by a distance less than the first notch-size forming preset distance 46.

As shown to the left in FIG. 2, a second predetermined length is represented by the double arrow indicated by reference number 46a. This double arrow 46a extends from the undersurface of short leg 44 of first L-shaped member 40 to the second surface 110b of spacer member 110. This second predetermined length is referred to hereinafter as a "second notch-size forming preset distance". In an embodiment of the invention, this second notch-size forming preset distance 46a is 1½ inches.

As best shown in FIG. 2A, spacer member 110 of post notch forming tool 10 comprises a second extended lip 110c formed by first surface 110a and second surface 110b of spacer member 110.

Intermediate leg 120 is integrally connected to spacer member 110 and acts to fixedly distance spacer member 110 away from second surface 24 of base 20 of post notch forming tool 10. With particular reference to FIG. 2A, when a 3-inch notch is to be formed in post P, the spacer member 110 is not attached to base 20 of tool 20, and the second surface 24 of first extended lip 20a of base 20 abuts the outer surface of the post to guide tool 10 down along the outer surface of the post. Likewise, when a 1½ inch notch is to be formed in post P, spacer member 110 is attached to base 20, and the second surface 110b of second extended lip 110c of spacer member 110 abuts the outer surface of the post to guide tool 10 down along the outer surface of the post. The forming of a different depth notch in a post is discussed further herein below.

Referring to FIGS. 1 and 2, the use of post notch forming tool 10 involves a step of attaching post notch forming tool 10 to blade B of hand-held saw S via the two blade-attaching bolt assemblies 62, 64 located on the ends of legs 42, 52 respectively of L-shaped members 40, 50 in a manner apparent to one skilled in the art.

Methods of forming one or more notches in a post by using the post notch forming tool 10 of the invention is illustrated in FIGS. 3A through 3E and FIG. 4.

One such method includes the step of: providing a post P having a body PB; an end PE; a first side PS1, a second side PS2; a longitudinal axis PL extending from end PE and inwardly thereof; and a transverse axis PT (FIG. 1) extending from first side PS1 at a right angle relative to longitudinal axis PL.

Figure 3A:
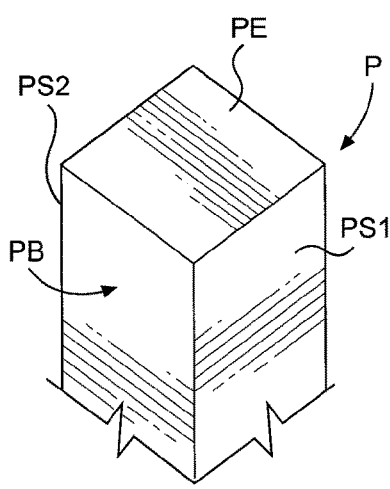
FIG. 3A is a perspective view of an end of a post.
Figure 3B:
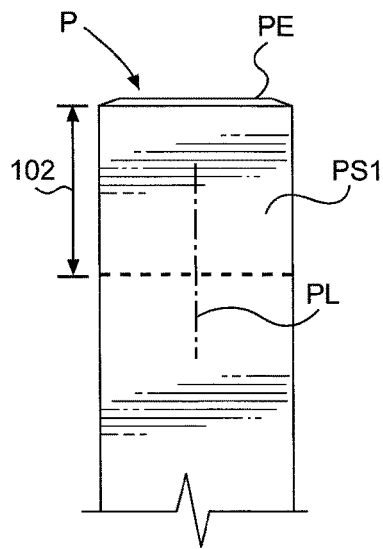
FIG. 3B is a right-side view of the post of FIG. 3A.
Figure 3C:
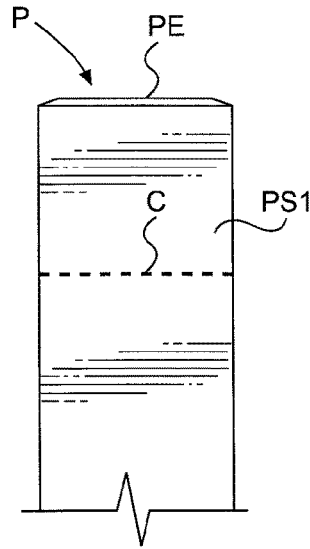
FIG. 3C is a right-side view of the post of FIG. 3A similar to FIG. 3B.
Figure 3D:
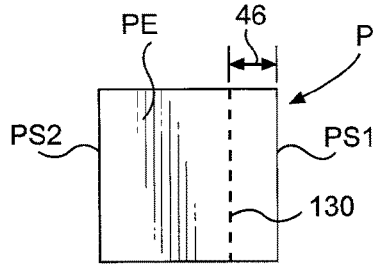
FIG. 3D is an end view of the post of FIG. 3A.
Figure 3E:
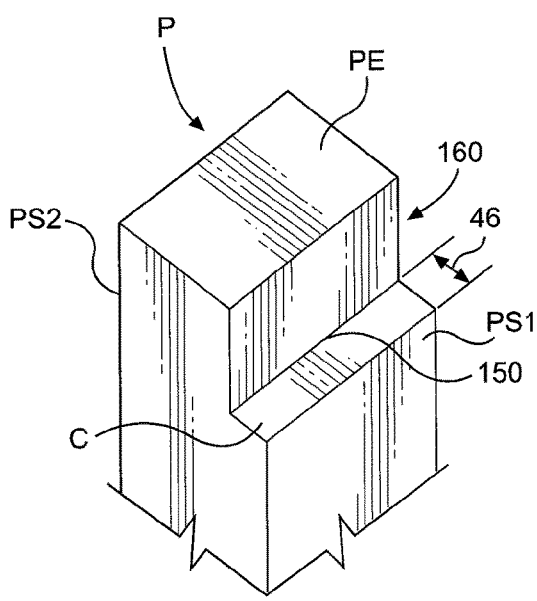
FIG. 3E is a perspective view of the post of FIG. 3A with an L-shaped notch formed in the right side of the end of the post.

Further steps include: providing a post notch forming tool 10 having a base 20 with a first extended lip portion 20a formed by first surface 22 and second surface 24 of the base, a first end 26, and a second end 28; a handle 30 mounted on the first surface 22 of the base 20; a first L-shaped member 40 having a first leg 42 connected to the first end 26 of the base 20 and a second leg spaced away from the second surface 24 of the base by a first notch-size forming preset distance 46; a second L-shaped member 50 having a first leg 52 connected to the second end 28 of the base 20 and a second leg 54 spaced away from the second surface 24 of the base 20 by the first notch-size forming preset distance 46; a first blade-attaching bolt assembly 62 on the second leg of first L-shaped member 40; and a second blade-attaching bolt assembly 64 on the second leg of second L-shaped member 50; providing a power saw S which includes a cutting blade B operationally connected to a motor M for reciprocation thereof when the motor is actuated; and determining a longitudinal distance indicated in FIG. 3B by reference number 102 which is measured from the end PE of post P in the direction of the longitudinal axis PL of the post.

Further steps include: at the longitudinal distance 102 (FIG. 3B) using blade B of saw S to form a transverse cut C (FIG. 3C) into the post P in the first side PS1 (FIG. 3E) of the post toward the longitudinal axis PL of the post a distance equal to the first notch-size forming preset distance 46; using the blade-attaching bolt assemblies 62, 64 on the second legs 44, 54 of L-shaped members 40, 50 to attach post notch forming tool 10 to cutting blade B of the power saw S for reciprocation of the tool 10 with the cutting blade B; positioning the cutting blade B of the power saw S with the attached post notch forming tool 10 at location 130 (FIG. 3D) adjacent to the end PE of the post and directed from the end of the post along the longitudinal axis toward the transverse cut C (FIG. 3C); positioning the first extended lip 20a of base 20 of the post notch forming tool 10 such as to be in sliding contact along the outer surface of the first side PS1 of the post wherein the blade B of the power saw S is spaced away from the outer surface of first side PSI of the post by a distance equal to the first notch-size forming preset distance 46.

Additional steps include: operating the power saw S to cause blade B of the power saw to reciprocate and to cut into the post P from the end PE of the post in the direction of the longitudinal axis toward the transverse cut C while maintaining the first extended lip 20a of base 20 of tool 10 in sliding contact with the outer surface of the post to form a longitudinal cut down into the post as indicated at reference number 150 (FIG. 3E) in the post which is spaced from the outer surface of the post by the first notch-size forming preset distance 46 and which longitudinal cut 150 intersects the transverse cut C to form a notched block (not shown) in the post; and removing the notched block from the post to form a notch 160 in the right side of the post which extends from the end of the post PE in the direction of the longitudinal axis PL to the transverse cut C in the post. It is to be appreciated that the depth of notch 160 will be approximately equal to the dimension of the first notch-size forming preset distance 46. That is, if first notch-size forming preset distance is 3 inches, then the depth of notch 160 inwardly from the outer surface of the post will be 3 inches.

Figure 4:
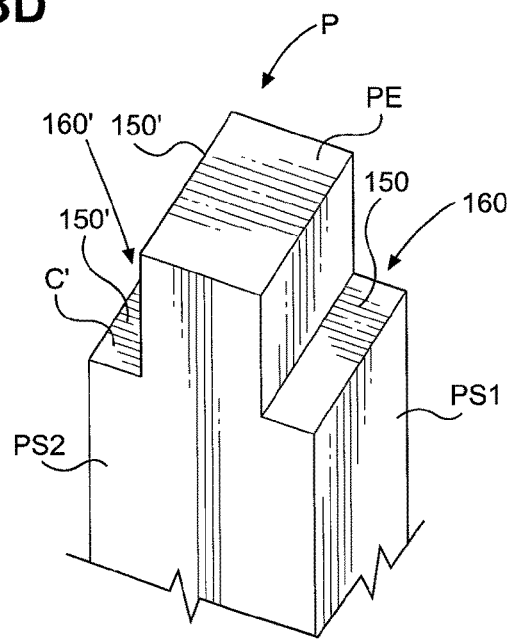
FIG. 4 is a perspective view of the post of FIG. 3A with an L-shaped notch formed in the right and the left sides of the end of the post.

As can be understood from FIG. 4, further steps may include forming a second notch 160' on the opposite side or second side PS2 of the post. These steps include: at the longitudinal distance 102 (FIG. 3B), using blade B of saw S to form a second transverse cut C' in the post from the outer surface of the post toward the longitudinal axis PL of the post equal to the first notch-size forming preset distance 46; positioning the cutting edge of the cutting blade B with the post notch forming tool 10 attached thereto adjacent to the end PE of the post and directed from the end of the post along the longitudinal axis PL toward the transverse cut C'; positioning first extended lip 20a of base 20 of post notch forming tool 10 into sliding engagement with the outer surface of the post so that the blade B of power saw S is spaced away from the outer surface of the post by a distance equal to the first preset distance 46; operating the power saw S to cause blade B to reciprocate to cut down into the post from the end PE of the post in the direction of the longitudinal axis PL toward the transverse cut C' while maintaining first extended lip 20a of base 20 in sliding contact with the outer surface of second side PS2 of the post to form a second longitudinal cut 150' in the post which is spaced away from the outer surface of the post by a distance equal to the first notch-size forming preset distance 46; causing the second longitudinal cut 150' to intersect the second transverse cut C' to form a second notch-forming block in the post; and removing the second notch-forming block from the post to form a second notch 160' in the second side PS2 of the post which extends from the end PE of the post in the direction of the longitudinal axis PL to the second transverse cut C' in the post. The inward depth of first notch 160 and second notch 160' from the outer surface of the post P is 3 inches.

If one or more notches in the post are to have a depth less than that of the first notch-size forming preset distance 46, that is, 1½ inches, then spacer member 110 is attached to tool 10. As set forth herein above, this involves securing spacer member 110 via bolts 116 and 118 to L-shaped members 40, 50 as shown in FIG. 2 and attaching tool 10 to blade B of hand-held power saw S. In this instance, the second surface 110b of second extended lip 110c (FIG. 2) of spacer member 110 will be in sliding contact with the outer surface of the post. The above several steps for forming one or more notches 160, 160' in a post will be followed to form one or more notches in the post with a depth equal to the second notch-size forming preset distance 46a, that is, 1½ inches deep from the outer surface PS of the post P.

It is to be appreciated that the transverse cuts C and C' (FIG. 3C and FIG. 4) are formed by the blade of the saw S prior to the post notch forming tool 10 is attached to the blade of the saw, and that the transverse cuts will measure either 3 inches or 1½ inches, depending on the desired dimension for the notch 160, 160' in the end of post P, and depending on whether tool 10 is used with or without spacer member 110. It is to be further appreciated that if a notch of 1½ inches is formed in the post P, then in FIGS. 3D and 3E, the reference number 46 will be reference number 46a to represent the dimension of the notch.

While the present invention has been described in connection with preferred embodiments of the invention, it will be understood that other similar embodiments may be used or modifications and additions may be made to the described embodiments for performing the same function of the present invention without deviating therefrom. Accordingly, it is intended by the appended claims to cover all such changes and modifications as come within the spirit and scope of the invention.

What is claimed is:

1. A post notch forming tool for forming at least one notch in an end of a rectangularly shaped post and structured to be attachable to a hand held saw, comprising:
   a base having a first surface and a second surface forming a first extended lip, a first end, and a second end;
   a handle mounted on the first surface of the base;
   a first L-shaped member having a first leg connected to the first end of the base and a second leg spaced away from the second surface of the base by a first notch-size forming preset distance;
   a second L-shaped member having a first leg connected to the second end of the base and a second leg spaced away from the second surface of the base by the first notch-size forming preset distance;
   a first blade-attaching bolt assembly secured to the second leg of the first L-shaped member for attaching the second leg of the first L-shaped member to the hand held saw;
   a second blade-attaching bolt assembly secured to the second leg of the second L-shaped member for attaching the second leg of the second L-shaped member to the hand held saw; and
   a spacer member selectively attachable to the first legs of the first and second L-shaped members for forming a second extended lip which defines a second notch-size forming preset distance;
   the spacer member comprising an intermediate leg member which is integrally connected to the spacer member and which is connected to the second surface of the base to fixedly space the spacer member away from the second surface of the base of the post notch forming tool.

2. The post notch forming tool of claim 1, wherein the first notch-size forming preset distance measures approximately 3 inches and the second notch-size forming preset distance measures approximately 1½ inches.

3. The post notch forming tool of claim 1, wherein the first extended lip of the base and the second extended lip of the spacer member each have a substantially flat surface area extending longitudinally downwardly from the handle of the post notch forming tool and extending transversely across the base of the post notch forming tool for engagement of the first extended lip and the second extended lip with an outer surface of the rectangularly shaped post for the forming of the notch in the end of the post.

4. A post notch forming tool for forming at least one notch in an end of a rectangularly shaped post and structured to be attached to a hand held saw, comprising:
   a base having a first surface and a second surface forming a first extended lip, a first end, and a second end;
   a handle mounted on the first surface of the base;
   a first L-shaped member having a first leg connected to the first end of the base and a second leg spaced away from the second surface of the base by a first notch-size forming preset distance;
   a second L-shaped member having a first leg connected to the second end of the base and a second leg spaced away from the second surface of the base by the first notch-size forming preset distance;
   a first blade-attaching bolt assembly secured to the second leg of the first L-shaped member for attaching the second leg of the first L-shaped member to the hand held saw; and
   a second blade-attaching bolt assembly secured to the second leg of the second L-shaped member for attaching the second leg of the second L-shaped member to the hand held saw;
   the first extended lip of the base having a substantially flat surface area extending longitudinally downwardly relative to the handle of the post notch forming tool and extending transversely relative to the base of the post notch forming tool for engagement of the first extended lip against an outer surface of the rectangularly shaped post for the forming of the notch in the end of the post;
   a spacer member selectively attachable to the first legs of the first and second L-shaped members and having a first surface and a second surface forming a second extended lip;
   a second notch-size forming preset distance defined from the second extended lip to the second leg of the first L-shaped member and the second leg of the second L-shaped member; and
   the second extended lip having a substantially flat surface area extending longitudinally downwardly relative to the handle of the post notch forming tool and extending transversely relative to the base of the post notch forming tool for engagement of the first extended lip against an outer surface of the rectangularly shaped post for the forming of the notch in the end of the post.

5. The post notch forming tool of claim 4, wherein the spacer member comprises an intermediate leg member which is integrally connected to the spacer member and which is connected to the second surface of the base to fixedly space the spacer member away from the second surface of the base of the post notch forming tool.

6. The post notch forming tool of claim 4, wherein the first notch-size forming preset distance measures approximately 3 inches and the second notch-size forming preset distance measures approximately 1½ inches.

* * * * *